(12) United States Patent
Heckmeier et al.

(10) Patent No.: US 6,635,190 B2
(45) Date of Patent: Oct. 21, 2003

(54) LIQUID-CRYSTALLINE MEDIUM

(75) Inventors: Michael Heckmeier, Bensheim (DE); Sabine Schoen, Darmstadt (DE); Detlef Pauluth, Ober-Ramstadt (DE); Kazuaki Tarumi, Seeheim (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 23 days.

(21) Appl. No.: 09/897,764

(22) Filed: Jul. 3, 2001

(65) Prior Publication Data

US 2002/0038859 A1 Apr. 4, 2002

(30) Foreign Application Priority Data

Jul. 4, 2000 (DE) .......................... 100 32 346

(51) Int. Cl.⁷ .................... C09K 19/30; C09K 19/34; C09K 19/12
(52) U.S. Cl. ..................... 252/299.63; 252/299.61; 252/299.66; 252/299.67
(58) Field of Search ................ 252/299.63, 299.66, 252/299.61, 299.67; 428/1.1

(56) References Cited

U.S. PATENT DOCUMENTS

| 4,302,352 A | 11/1981 | Eidenschink et al. |
| 4,331,552 A | 5/1982 | Eidenschink et al. |
| 4,419,264 A | 12/1983 | Eidenschink et al. |
| 5,744,060 A | * 4/1998 | Tarumi et al. ......... 252/299.63 |

FOREIGN PATENT DOCUMENTS

DE 19529106 * 2/1997

OTHER PUBLICATIONS

19529106 A1, E. Bartmann et al., Aug. 8, 1995 (abstract only).
64193A, R. Eidenschin et al., Apr. 16, 1982 (abstract only).
2948836A, R. Eidenschin et al., Jun. 11, 1981 (abstract only).
14840A, R. Eidenschin et al., Sep. 3, 1980 (abstract only).

* cited by examiner

Primary Examiner—Shean C. Wu
(74) Attorney, Agent, or Firm—Millen, White, Zelano & Branigan, P.C.

(57) ABSTRACT

The invention relates to a liquid-crystalline medium based on a mixture of polar compounds having positive dielectric anisotropy, characterized in that it comprises one or more compounds of the general formula I:

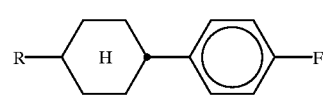

and simultaneously one or more compounds of the formula IIA:

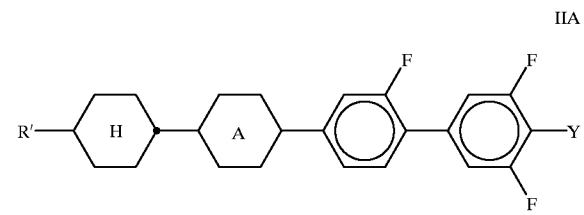

and/or one or more compounds of the formula IIB:

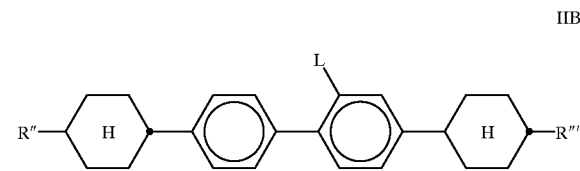

in which R, R', R", R'",

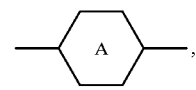

L and Y are as defined in claim 1.

19 Claims, No Drawings

LIQUID-CRYSTALLINE MEDIUM

The present invention relates to a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems in the transition regions.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible decrease with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
extended nematic phase range (in particular down to low temperatures)
the ability to switch at extremely low temperatures (outdoor use, automobile, avionics)
increased resistance to UV radiation (sunlight and radiation during UV-bonding of the displays) and consequently longer life.

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has an object of providing media, in particular for MLC, TN or STN displays of this type, which do not have the above-mentioned disadvantages or only do so to a reduced extent, and preferably simultaneously have very high specific resistances and low threshold voltages.

Upon further study of the specification and appended claims, further objects and advantages of this invention will become apparent to those skilled in the art.

It has now been found that these and other objects can be achieved if media according to the invention are used in displays.

The invention thus relates to a liquid-crystalline medium based on a mixture of polar compounds of positive dielectric anisotropy, characterized in that it comprises one or more compounds of the formula I:

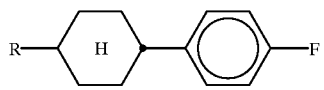

I in which

R is H or an alkyl, alkoxy, alkenyl or alkenyloxy radical having 1 to 15 carbon atoms, and at the same time, one or more compounds of the formula IIA and/or one or more compounds of the formula IIB:

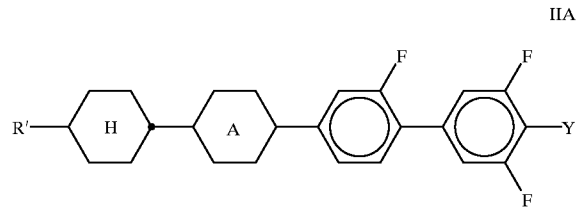

IIA in which

R' is an alkyl or alkoxy radical having 1 to 10 carbon atoms or alkenyl having 2 to 10 carbon atoms,

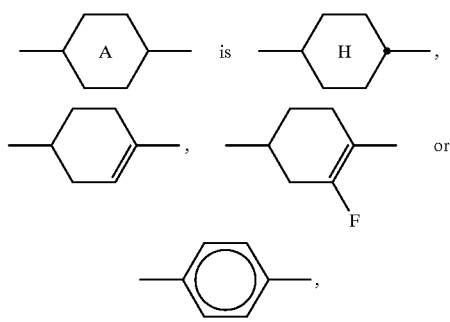

Y is F, Cl, a halogenated alkyl radical having 1 to 5 carbon atoms, in which, in addition, one $CH_2$ group may be replaced by —O— or —CH=CH—,

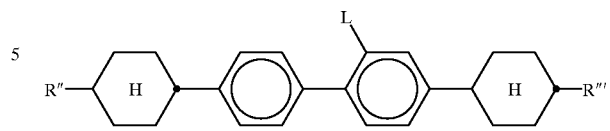

IIB in which

R" and R'", independently of one another, are an alkyl or alkoxy radical having 1 to 10 carbon atoms or an alkenyl radical having 2 to 10 carbon atoms, and L is H or F, in particular H.

The compounds of the formulae I, IIA and IIB have a broad range of applications. Depending on the choice of substituents, these compounds can serve as base materials of which liquid-crystalline media are predominantly composed; however, it is also possible to add compounds of the formulae I and IIA and/or IIB to liquid-crystalline base materials from other classes of compound in order, for example, to modify the dielectric and/or in particular the optical anisotropy of a dielectric of this type and/or in order to optimize its threshold voltage and/or if desired its viscosity.

In the pure state, the compounds of the formulae I, IIA and IIB are colorless and form liquid-crystalline mesophases in a temperature range which is favorably located for electro-optical use. They are stable chemically, thermally and to light.

Compounds of the formula I have already been disclosed in DE 29 07 332.

Compounds of the formula II are described, for example, in DE 195 29 106 A1 or can be prepared analogously thereto.

Compounds of the formula IIB are disclosed in DE 29 48 836 and DE 31 17 152.

In the media according to the invention comprising compounds of the formulae I, IIA and/or IIB, Y is preferably F or $OCF_3$, in particular F.

The compounds of the formula IIA are preferably:

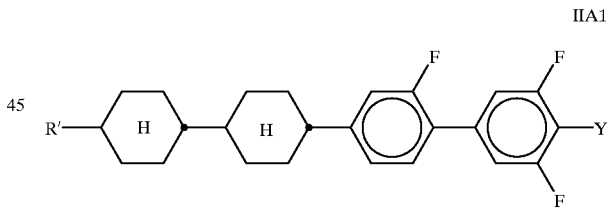

IIA1

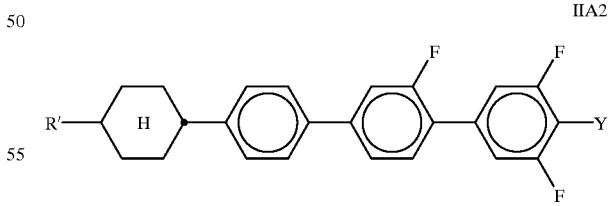

IIA2 in which

R' is as defined herein. R' in the compounds of the formula IIA and in the sub-formulae is preferably alkyl, alkoxy or alkenyl. Y is preferably F, Cl, $OCF_3$, $OCHF_2$, $OCHFCF_3$, $OC_2F_5$, $C_2F_5$, $CF_3$, $OCF_2CHFCF_3$, $CH=CF_2$, $OCH=CF_2$, $CF=CF_2$ or $OCF=CF_2$.

If R, R', R" and/or R'" is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Compounds of the formula I, IIA and/or IIB containing branched wing groups R, R', R" and/or R''' may occasionally be of importance owing to better solubility in the conventional liquid-crystalline base materials, but in particular as chiral dopants if they are optically active. Smectic compounds of this type are suitable as components of ferroelectric materials.

Compounds of the formula I having $S_A$ phases are suitable, for example, for thermally addressed displays.

Branched groups of this type generally contain not more than one chain branch. Preferred branched radicals R and/or R' are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy and 1-methylheptoxy.

R, R', R" and/or R''' are particularly preferably H, methyl, ethyl, n-propyl, n-pentyl or n-heptyl. L is preferably H. R is particularly preferably n-heptyl. R' is particularly preferably n-propyl. Y is preferably F.

The compounds of the formulae I, IIA and IIB are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy are far superior to previous materials from the prior art.

The preference for a low threshold voltage, a nematic phase at low temperature and a high $\Delta\epsilon$ has hitherto only been achieved to an inadequate extent. Although mixtures such as, for example, ZLI-3119 (Merck, Darmstadt) have high clearing points and favorable viscosities, they have, however, a $\Delta\epsilon$ of only +3.

Other mixture systems have comparable viscosities and $\Delta\epsilon$ values, but have only relatively high values for the threshold voltage.

The liquid-crystal mixtures according to the invention, while retaining the nematic phase preferably down to −20° C. and more preferably down to −30° C., particularly preferably down to −40° C., enable extremely low threshold voltages of preferably below 1.4 V, more preferably of below 1.2 V, particularly preferably of below 1.1 V, simultaneously dielectric anisotropy values $\Delta\epsilon$ preferably of $\geq 8$, more preferably $\geq 10$, and a high value for the specific resistance to be achieved, enabling excellent STN and MLC displays to be obtained. In particular, the mixtures are characterized by small operating voltages and very short response times at the same time as a high clearing point. For example, the mixtures preferably have a clearing point of from 65 to 120° C., more preferably 75 to 115° C.

The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The rotational viscosity at 20° C. is preferably <200 mPa.s, particularly preferably <150 mPa.s. The nematic phase range is preferably at least 90° C., in particular at least 100° C. This range preferably extends at least from −20° C. to +80° C.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I, IIA and IIB exhibit only a very small decrease in the HR with increasing temperature.

The UV stability of the mixtures according to the invention is also excellent, i.e. they exhibit an only small decrease in the HR on exposure to UV.

The media according to the invention are preferably based on a plurality (preferably from two to 4) of compounds of the formula I. The proportion of these compounds is preferably from 2 to 85%, more preferably from 3 to 60% and particularly preferably in the range from 4 to 12%, based on the total weight of the liquid crystalline medium. Further, it is preferred to have a plurality (preferably in each case from two to 4) of compounds of the formula IIA and/or IIB. The proportion of these compounds preferably being from 3 to 70%, more preferably 5–60% and particularly preferably in the range from 8 to 40%, based on the total weight of the liquid crystalline mixture.

The sum of the amount of the compounds of the formulae I, IIA and/or IIB is preferably from 5 to 85%, more preferably from 6 to 70% and particularly preferably from 7 to 50%, by weight based on the total liquid crystalline medium.

Very particularly preference is given to mixtures whose proportion of compounds of the formula I is from 2 to 6% and whose proportion of compounds of the formula I IA is 5–10% by weight, while the proportion of the compounds of the formula IIB is set at 0–8%.

The individual compounds of the formulae I to XX and their sub-formulae which can be used in the media according to the invention are either known or can be prepared analogously to the known compounds.

Preferred embodiments are indicated below:

The medium additionally comprises one or more compounds selected from the group consisting of the compounds of general formulae III to X:

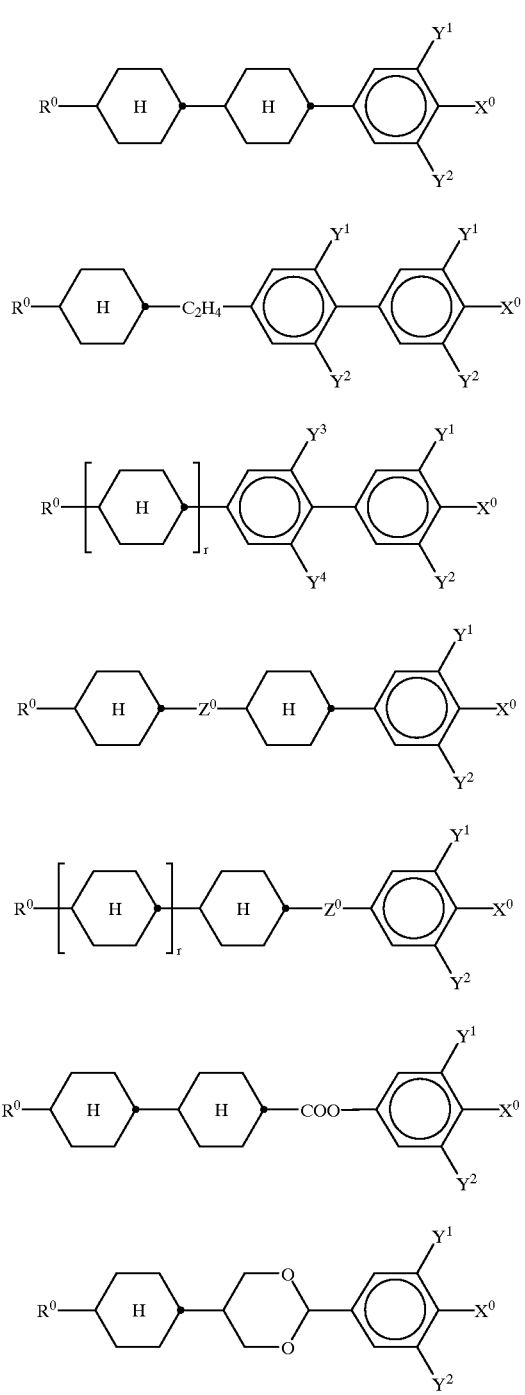

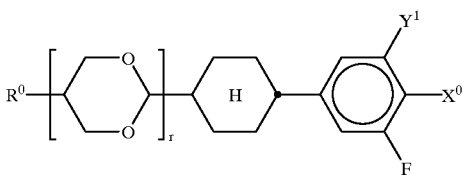

in which the individual radicals have the following meanings:

$R^0$: n-alkyl, oxaalkyl, fluoroalkyl or alkenyl, each having 1 to 9 carbon atoms, $Z^0$: —$C_2H_4$—, —$C_2F_4$—, —CF=CF—, —$CF_2O$—, —$OCF_2$—, —$CH_2O$— or —$OCH_2$—, $X^0$: F, Cl, halogenated alkyl, halogenated alkenyl or halogenated alkoxy having 1 to 6 carbon atoms, $Y^1$ and $Y^2$: each, independently of one another, H or F, $Y^3$ and $Y^4$: simultaneously H or F, r: 0 or 1.

the medium comprises, in addition to the compounds of the formulae I and IIA and/or IIB, one or more of the preferred compounds of the formulae IIIa, IIIb, IIIc, IIId, and/or IIIe:

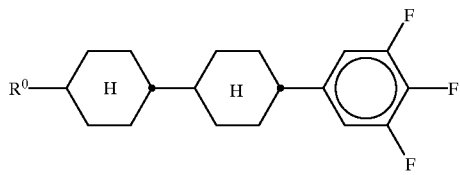

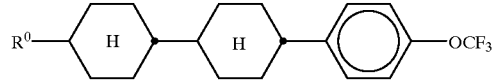

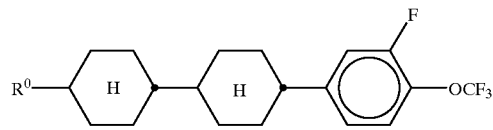

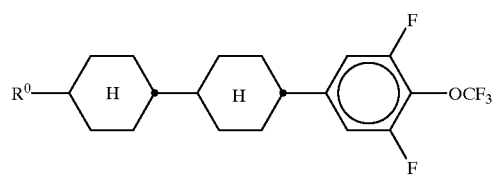

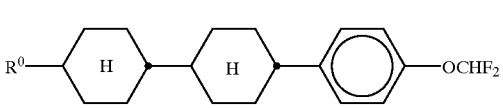

The compound of the formula V is preferably

Va
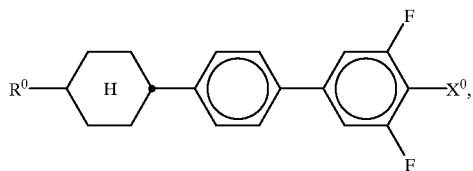

Vb
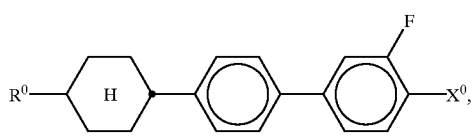

Vc
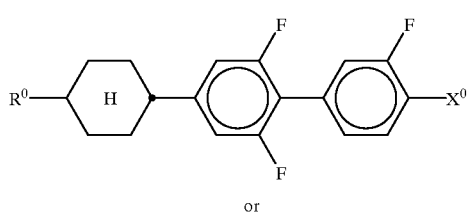

or

Vd
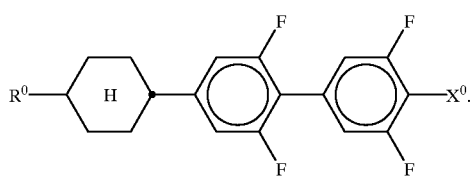

Medium additionally comprises one or more compounds selected from the group consisting of compounds of the general formulae XI to XVI:

XI
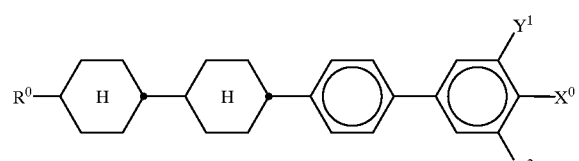

XII
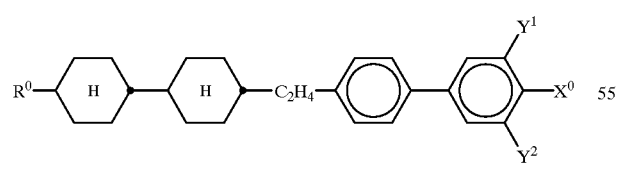

XIII
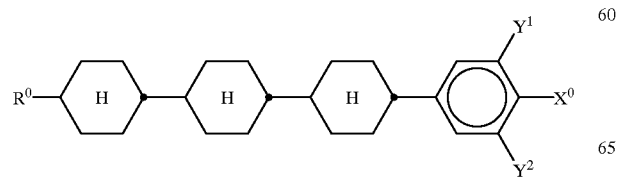

XIV
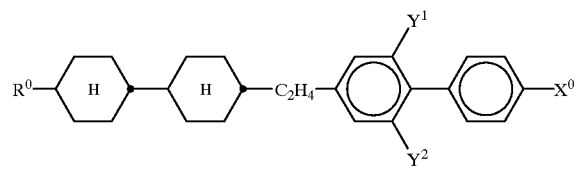

XV
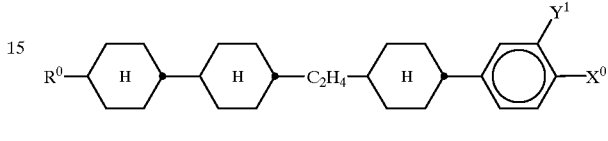

XVI
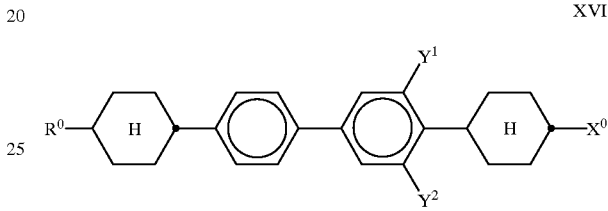

in which $R^0$, $X^0$, $Y^1$ and $Y^2$ each, independently of one another, have one of the above-mentioned meanings. $X^0$ is preferably F, Cl, $CF_3$, $OCF_3$ or $OCHF_2$. $R^0$ is preferably alkenyl or alkoxy having 1 to 7 carbon atoms, and $Y^1$ and $Y^2$ are preferably F;

The proportion of compounds of the formulae I to X together in the mixture as a whole is at least 50% by weight;

The proportion of compounds of the formulae III to XVI in the mixture as a whole is from 10 to 95% by weight;

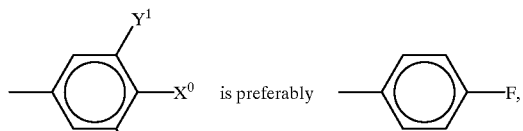

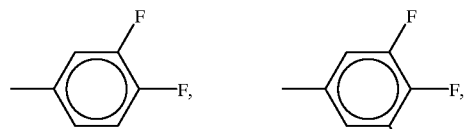

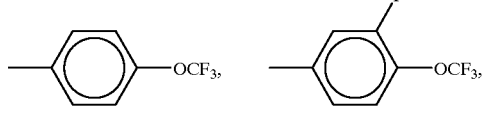

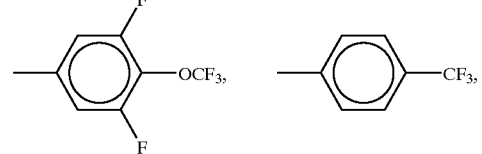

-continued

The medium comprises one or more compounds of the formulae III, IV, V and/or VII;

$R^0$ is preferably straight-chain alkyl having 2 to 7 carbon atoms;

The medium consists essentially of compounds of the formulae I to VII and IIA or IIB;

The medium consists essentially of compounds of the formulae I to III and IIA or IIB;

The medium additionally comprises one or more ester compounds of the formulae E1 to E5:

in which
$R^0$, $X^0$, $Y^1$ and $Y^2$ are as defined above, and L is H or F, and Alkyl and Alkyl* are each, independently of one another, a straight-chain alkyl radical having 1–8 carbon atoms.

Medium additionally comprises one or more compounds of the formulae Xa to Xf:

in which Alkyl and Alkyl* are each, independently of one another, a straight-chain alkyl radical having 1–8 carbon atoms, and Alkenyl and Alkenyl* are a 1E- or 3E-alkenyl radical having 2–8 carbon atoms.

The medium comprises further compounds, preferably selected from the following group consisting of the general formula XVII to XXI:

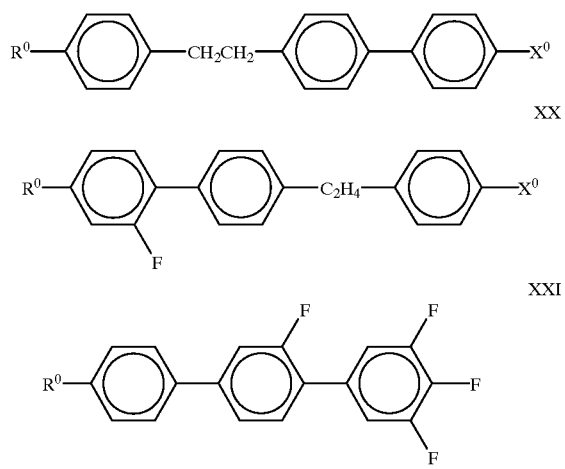

in which R⁰ and X⁰ are as defined above, and the 1,4-phenylene rings may be substituted by CN, chlorine or fluorine. The 1,4-phenylene rings are preferably monosubstituted or polysubstituted by fluorine atoms.

The (I+IIA+IIB): (III+IV+V+VI+VII) weight ratio is preferably from 1:10 to 10:1, in particular from 1:4 to 4:1.

Medium essentially consists of compounds selected from the group consisting of the general formula IA and/or IB and I to XVI.

It has been found that even a relatively small proportion of compounds of the formulae I, IIA and IIB mixed with conventional liquid-crystal materials, but in particular with one or more compounds of the formulae III, IV, V, VI and/or VII, results in a significant lowering of the threshold voltage and in low birefringence values, with broad nematic phases with low smectic-nematic transition temperatures being observed at the same time, which results in an improvement in the shelf life. Particular preference is given to mixtures which, besides one or more compounds of the formulae I and IIA and/or IIB, comprise one or more compounds of the formula III, in particular of the formulae IIIa and/or IIIb. The compounds of the formulae I to XXI and of the formulae IIA and IIB are colorless, stable and readily miscible with one another and with other liquid-crystalline materials.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably=1 and m is preferably from 1 to 6.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae (I+IIA+IIB) to (III+IV+V+VI and VII) depends substantially on the desired properties, on the choice of the components of the formulae I, IIA, IIB, III, IV, V, VI and/or VII, and on the choice of any other components that may be present. Suitable mixing ratios within the range given above can easily be determined from case to case.

The total amount of compounds of the formulae I to XXI and IIA and IIB in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae I to XXI and IIA and IIB.

In a particularly preferred embodiment, the media according to the invention comprise compounds of the formulae III to VII (preferably III and/or V, in particular IIIb). A favorable synergistic effect with the compounds of the formulae I, IIA and/or IIB results in particularly advantageous properties. In particular, mixtures comprising compounds of the formulae I, IIA and/or IIB and of the formulae III and V are distinguished by their low threshold voltages at the same time as high dielectric anisotropy values.

The construction of the STN or MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner which is conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

Unless otherwise stated, percentages denote percent by weight.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index. $\Delta \epsilon$ denotes the dielectric anisotropy ($\Delta \epsilon = \epsilon_\parallel - \epsilon_\perp$, where $\epsilon_\parallel$ denotes the dielectric constant parallel to the longitudinal molecular axes and $\epsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

The entire disclosure of all applications, patents and publications, cited above, and of corresponding German Application No. 10032346.4, filed Jul. 4, 2000 is hereby incorporated by reference.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| Nm | $C_nH_{2n+1}$ | $C_mH_{2m+1}$ | H | H |
| NOm | $C_nH_{2n+1}$ | $OC_mH_{2m+1}$ | H | H |
| nO.m | $OC_nH_{2n+1}$ | $C_mH_{2m+1}$ | H | H |
| N | $C_nH_{2n+1}$ | CN | H | H |
| nN.F | $C_nH_{2n+1}$ | CN | H | F |
| NF | $C_nH_{2n+1}$ | F | H | H |
| NOF | $OC_nH_{2n+1}$ | F | H | H |
| NCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| NS | $C_nH_{2n+1}$ | NCS | H | H |
| RVsN | $C_rH_{2r+1}$—CH=CH—$C_sH_{2s}$— | CN | H | H |
| REsN | $C_rH_{2r+1}$—O—$C_sH_{2s}$— | CN | H | H |
| NAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are shown in Tables A and B.

TABLE A

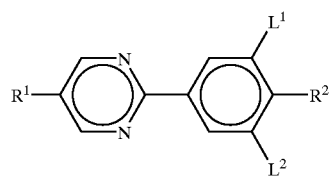

PYP

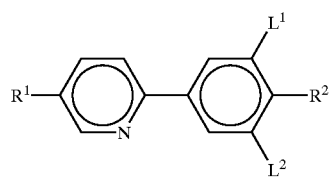

PYRP

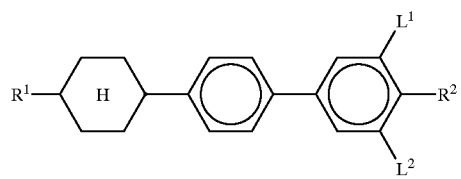

BCH

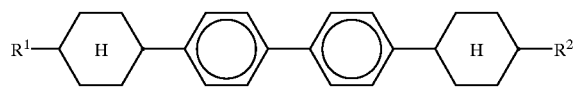

CBC

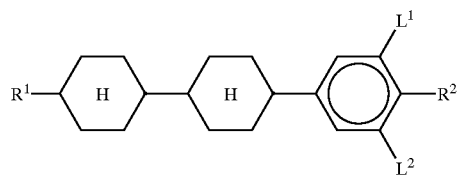

TABLE A-continued
CCH
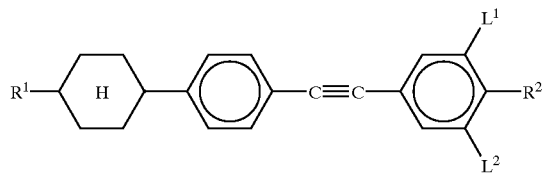
CCP
CPTP
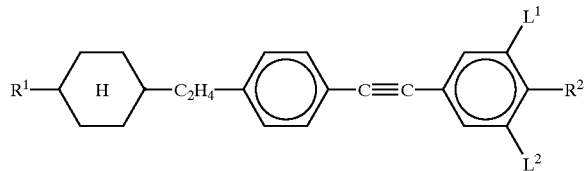
CEPTP
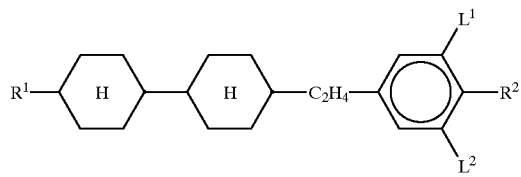
ECCP
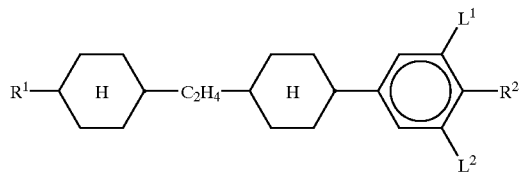
CECP
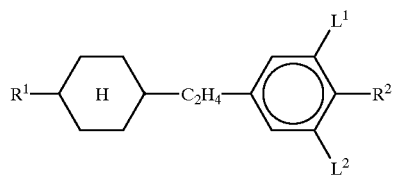
EPCH
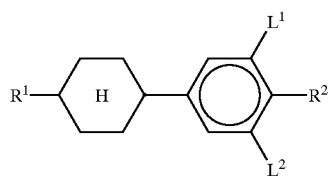
PCH
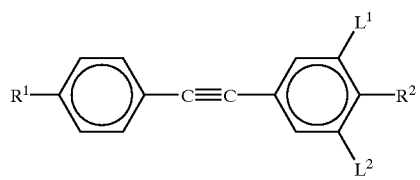
PTP
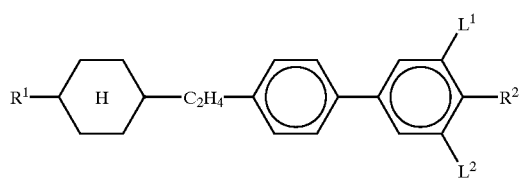
BECH
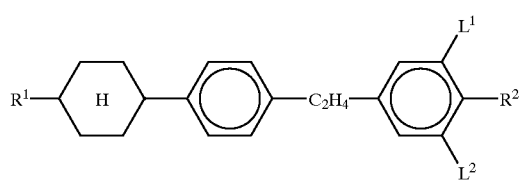
CPC
EBCH
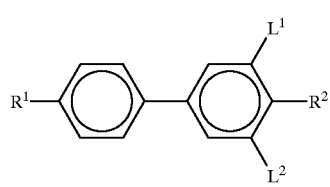
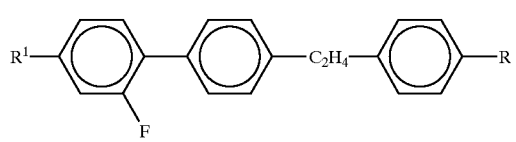

TABLE A-continued
B
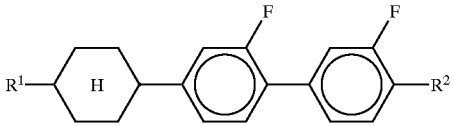
CGG
FET-nF
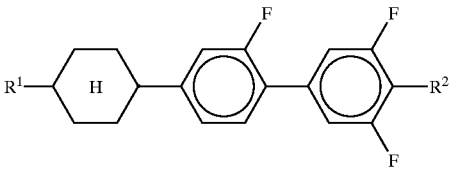
CGU
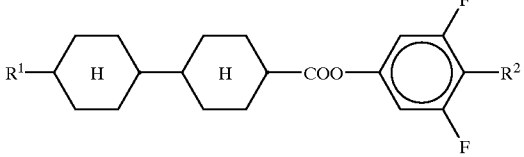
CCZU
TABLE B
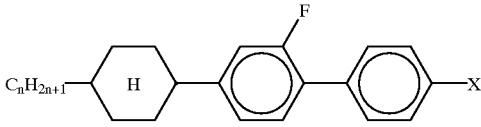
BCH-n.Fm
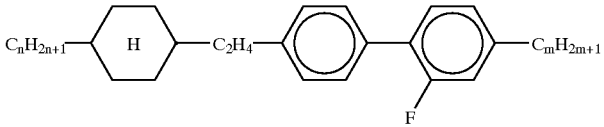
Inm
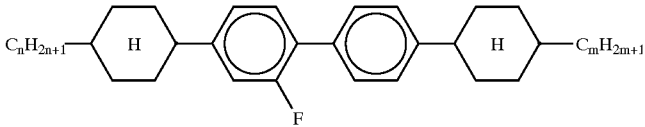
CBC-nmF
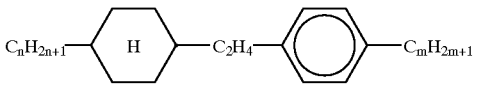
EPCH-nm
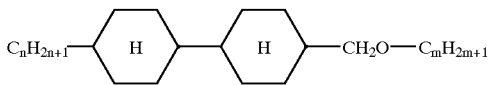
CCH-n1EM
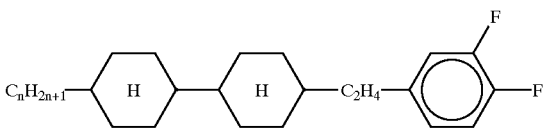
ECCP-nF.F
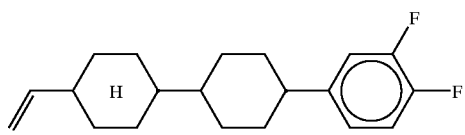

TABLE B-continued
CC-n-V
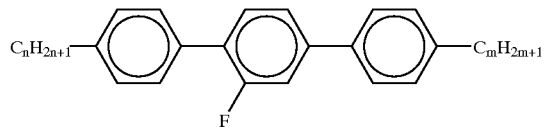
CCG-V-F
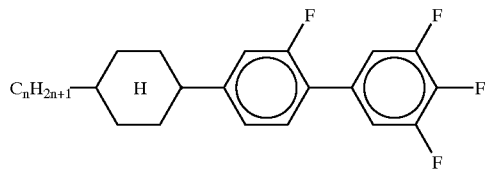
T-nFm
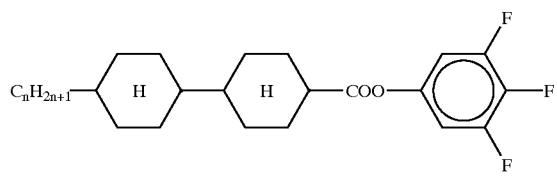
CGU-n-F
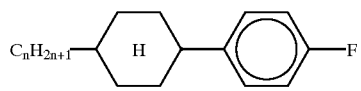
CCZU-n-F
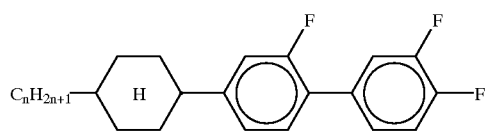
PCH-nF
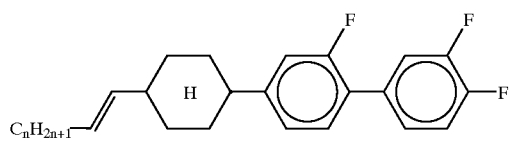
CGG-n-F
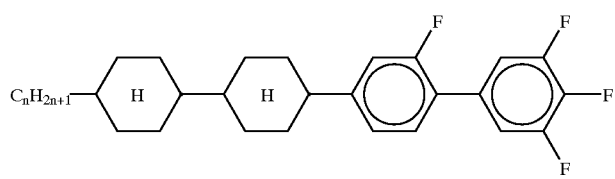
CGG-nV-F
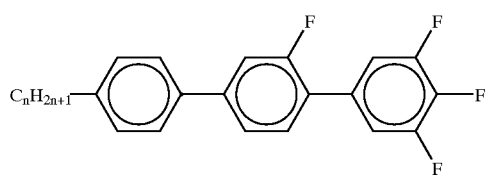
CCGU-nF
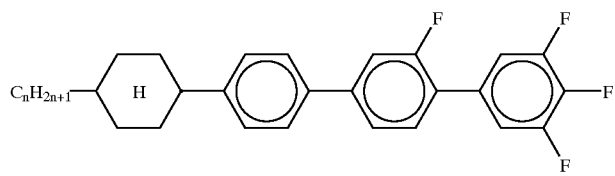
PGU-n-F
CPGU-n-F
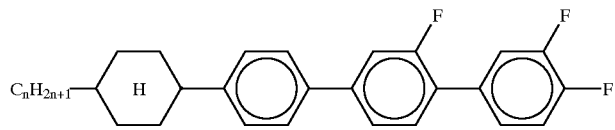
CPGG-n-F
TABLE C
Table C shows dopants which are usually employed in the compounds according to the invention.
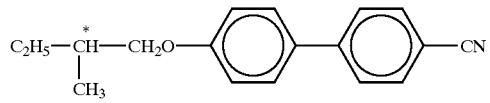
C 15
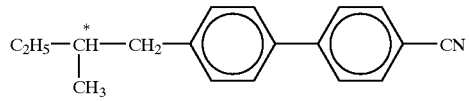
CB 15

TABLE C-continued
Table C shows dopants which are usually employed in the compounds according to the invention.
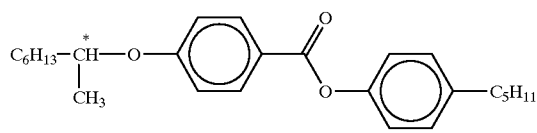
CM 21
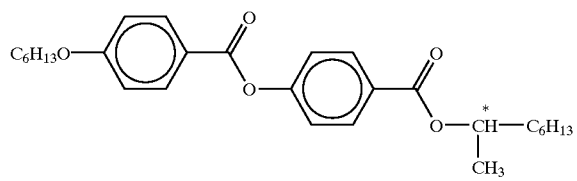
R/S-811
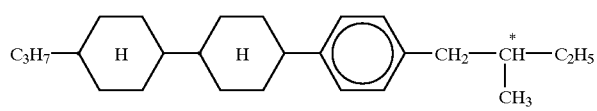
CM 44
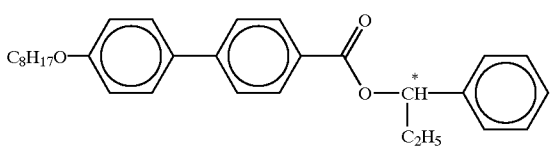
CM 45      CM 47
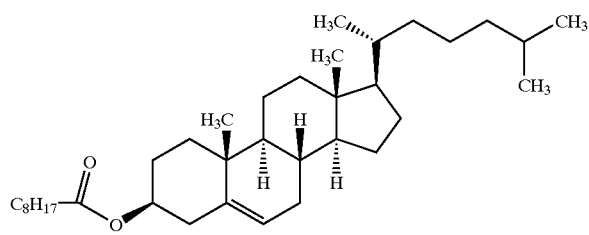
CN
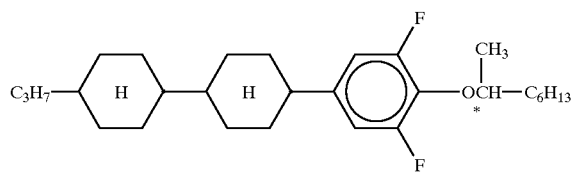
R/S-2011
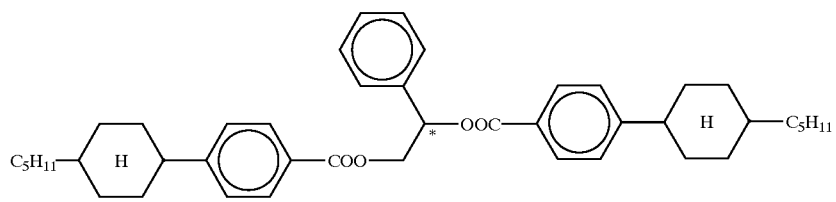
R/S-1011

TABLE C-continued

Table C shows dopants which are usually employed in the compounds according to the invention.

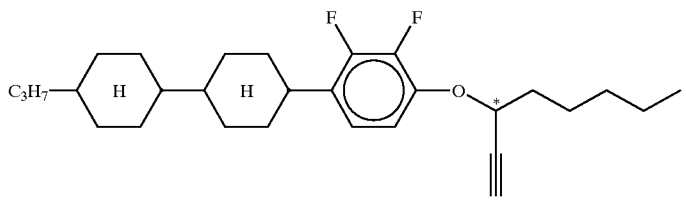

R/S-3011

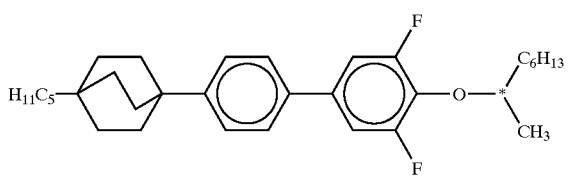

R/S-4011

The following examples are intended to explain the invention without restricting it. Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. An denotes optical anisotropy (589 nm, 20° C.), and the flow viscosity $v_{20}$ (mm$^2$/sec) and the rotational viscosity $\gamma_1$ [mPa·s] were determined at 20° C.

Example 1

| | | | |
|---|---|---|---|
| CCP-2F.F.F | 11.00% | Clearing point [° C.]: | 69 |
| CCP-3F.F.F | 6.00% | Δn [589 nm, 20° C.]: | 0.0903 |
| CCP-30CF$_3$ | 7.00% | Δε [1 kHz, 20° C.]: | 10.7 |
| CGU-2-F | 11.00% | | |
| CGU-3-F | 11.00% | | |
| CGU-5-F | 10.00% | | |
| BCH-3F.F.F | 5.00% | | |
| CCZU-2-F | 7.00% | | |
| CCZU-3-F | 15.00% | | |
| CCZU-5-F | 6.00% | | |
| PCH-7F | 4.00% | | |
| CCGU-3-F | 7.00% | | |

Comparative Example 1

| | | | |
|---|---|---|---|
| CCP-2F.F.F | 10.00% | Clearing point [° C.]: | 69 |
| CCP-3F.F.F | 10.00% | Δn [589 nm, 20° C.]: | 0.0867 |
| CCP-30CF$_3$ | 6.00% | Δε [1 kHz, 20° C.]: | 10.7 |
| CGU-2-F | 11.00% | | |
| CGU-3-F | 11.00% | | |
| CGU-5-F | 10.00% | | |
| BCH-3F.F.F | 5.00% | | |
| CCZU-2-F | 7.00% | | |
| CCZU-3-F | 15.00% | | |
| CCZU-5-F | 7.00% | | |
| ECCP-5F.F | 8.00% | | |

Example 2

| | | | |
|---|---|---|---|
| CCP-2F.F.F | 4.00% | Clearing point [° C.]: | 87 |
| CCP-3F.F.F | 6.00% | Δn [589 nm, 20° C.]: | 0.1079 |
| CCP-30CF$_3$-F | 9.00% | Δε [1 kHz, 20° C.]: | 10.3 |
| CCP-30CF$_3$ | 9.00% | | |
| CCP-40CF$_3$ | 5.00% | | |
| CCP-50CF$_3$ | 8.00% | | |
| CGU-2-F | 8.00% | | |
| CGU-3-F | 10.00% | | |
| CGU-5-F | 6.00% | | |
| BCH-3F.F.F | 11.00% | | |
| BCH-5F.F.F | 10.00% | | |
| CBC-33F | 4.00% | | |
| PCH-7F | 4.00% | | |
| CCGU-3-F | 6.00% | | |

Comparative Example 2

| | | | |
|---|---|---|---|
| CCP-3F.F.F | 10.00% | Clearing point [° C.]: | 87 |
| CCP-30CF$_3$-F | 9.00% | Δn [589 nm, 20° C.]: | 0.1063 |
| CCP-30CF$_3$ | 8.00% | Δε [1 kHz, 20° C.]: | 9.9 |
| CCP-40CF$_3$ | 6.00% | | |
| CCP-50CF$_3$ | 8.00% | | |
| CGU-2-F | 8.00% | | |
| CGU-3-F | 10.00% | | |
| CGU-5-F | 7.00% | | |
| BCH-3F.F.F | 11.00% | | |
| BCH-5F.F.F | 10.00% | | |
| CBC-33F | 3.00% | | |
| ECCP-5F.F | 10.00% | | |

Example 3

| | | | |
|---|---|---|---|
| CC-5-V | 11.00% | Clearing point [° C.]: | 90 |
| CCG-V-F | 6.00% | Δn [589 nm, 20° C.]: | 0.1114 |
| CCP-30CF$_3$ | 7.00% | Δε [1 kHz, 20° C.]: | 6.6 |
| CCP-2F.F.F | 4.00% | | |

-continued

| | |
|---|---|
| CCP-3F.F.F | 2.00% |
| BCH-3F.F.F | 16.00% |
| BCH-5F.F.F | 12.00% |
| BCH-2F.F | 9.00% |
| BCH-32F | 8.00% |
| BCH-52F | 4.00% |
| PCH-7F | 10.00% |
| CBC-33 | 6.00% |
| CCGU-3-F | 5.00% |

Comparative Example 3

| | | | |
|---|---|---|---|
| CC-5-V | 10.00% | Clearing point [° C.]: | 91 |
| CCG-V-F | 6.00% | Δn [589 nm, 20° C.]: | 0.1078 |
| CCP-30CF$_3$ | 7.00% | Δε [1 kHz, 20° C.]: | 6.6 |
| CCP-3F.F.F | 7.00% | | |
| ECCP-3F.F | 12.00% | | |
| ECCP-5F.F | 10.00% | | |
| BCH-3F.F.F | 14.00% | | |
| BCH-5F.F.F | 13.00% | | |
| BCH-2F.F | 9.00% | | |
| BCH-32F | 7.00% | | |
| BCH-52F | 5.00% | | |

Example 4

| | | | |
|---|---|---|---|
| PCH-7F | 2.00% | Clearing point [° C.]: | 80 |
| CCP-20CF$_3$ | 3.00% | Δn [589 nm, 20° C.]: | 0.0993 |
| CCP-30CF$_3$ | 3.00% | Δε [1 kHz, 20° C.]: | 10.7 |
| CCP-2F.F.F | 9.00% | | |
| CCP-3F.F.F | 10.00% | | |
| CCP-5F.F.F | 3.00% | | |
| BCH-2F.F | 6.00% | | |
| BCH-3F.F | 7.00% | | |
| BCH-3F.F.F | 14.00% | | |
| CGU-2-F | 7.00% | | |
| CGU-3-F | 7.00% | | |
| CCZU-2-F | 3.00% | | |
| CCZU-3-F | 15.00% | | |
| CCZU-5-F | 3.00% | | |
| CCGU-3-F | 8.00% | | |

Example 5

| | | | |
|---|---|---|---|
| PCH-7F | 1.50% | Clearing point [° C.]: | 90 |
| CC-5-V | 8.50% | Δn [589 nm, 20° C.]: | 0.0876 |
| CCP-20CF$_3$.F | 12.00% | Δε [1 kHz, 20° C.]: | 8.8 |
| CCP-30CF$_3$.F | 10.00% | | |
| CCP-50CF$_3$.F | 9.00% | | |
| CCP-20CF$_3$ | 3.00% | | |
| CCP-30CF$_3$ | 3.00% | | |
| CCP-40CF$_3$ | 4.00% | | |
| CCP-2F.F.F | 10.00% | | |
| CCP-3F.F.F | 13.00% | | |
| CCP-5F.F.F | 4.00% | | |
| BCH-3F.F.F | 14.00% | | |
| CCGU-3-F | 8.00% | | |

Example 6

| | | | |
|---|---|---|---|
| PCH-7F | 4.50% | S → N [° C.]: | <−40.0 |
| CCH-35 | 5.00% | Clearing point [° C.]: | +90.0 |
| CCP-20CF$_3$.F | 11.00% | Δn [589 nm, 20° C.]: | +0.0948 |
| CCP-30CF$_3$.F | 12.00% | γ$_1$ [20° C., mPa·s]: | 194 |
| CCP-50CF$_3$.F | 11.00% | | |
| ECCP-5F.F | 9.00% | | |
| PGU-5-F | 2.00% | | |
| CGU-5-F | 9.50% | | |
| CCP-2F.F.F | 9.00% | | |
| CCP-5F.F.F | 5.00% | | |
| CCP-50CF$_3$ | 6.00% | | |
| CCGU-3-F | 4.00% | | |
| BCH-5F.F.F | 12.00% | | |

Example 7

| | | | |
|---|---|---|---|
| PCH-7F | 4.50% | S → N [° C.]: | <−40.0 |
| CCH-35 | 4.50% | Clearing point [° C.]: | +89.5 |
| CCO · 29CF$_3$ · F | 11.00% | Δn [589 nm, 20° C.]: | +0.0929 |
| CCP-30CF$_3$.F | 12.00% | γ$_1$ [20° C., mPa · s]: | 189 |
| CCP-50CF$_3$· F | 11.00% | | |
| ECCP-5F.F | 9.50% | | |
| PGU-5-F | 3.50% | | |
| CGU-3-F | 2.00% | | |
| CGU-5-F | 9.00% | | |
| CCP-2F.F.F | 8.00% | | |
| CCP-3F.F.F | 4.00% | | |
| CCP-5F.F.F | 5.00% | | |
| CCP-30CF$_3$ | 2.00% | | |
| CCP-50CF$_3$ | 5.00% | | |
| CCGU-3-F | 3.00% | | |
| BCH-5F.F.F | 6.00% | | |

Example 8

| | | | |
|---|---|---|---|
| PCH-7F | 12.00% | Clearing point [° C.]: | +84.0 |
| CCP-40CF$_3$ | 3.00% | Δn [589 nm, 20° C.]: | +0.1053 |
| CCP-50CF$_3$ | 5.00% | d · Δn [20° C., μm]: | 0.55 |
| CCP-5F.F.F | 6.00% | Twist [°]: | 90 |
| BCH-3F.F.F | 4.00% | V$_{10}$ [V]: | 1.30 |
| BCH-5F.F.F | 14.00% | | |
| CGU-3-F | 9.00% | | |
| CGU-5-F | 15.00% | | |
| CCGU-3-F | 6.00% | | |
| CCZU-3-F | 13.00% | | |
| CCZU-5-F | 3.00% | | |
| CCP-V2-1 | 7.00% | | |
| CBC-55F | 3.00% | | |

Example 9

| | | | |
|---|---|---|---|
| CCP-2F.F.F | 11.00% | S → N [° C.]: | <−30.0 |
| CCP-3F.F.F | 13.00% | Clearing point [° C]: | +71.0 |
| CCP-5F.F.F | 4.00% | Δn [589 nm, 20° C.]: | +0.0854 |
| CCP-20CF$_2$ · F.F | 12.00% | d · Δn [20° C., μm]: | 0.55 |
| CCP-50CF$_2$ · F.F | 7.00% | Twist [°]: | 90 |
| CCZU-2-F | 4.00% | V$_{10}$ [V]: | 1.07 |
| CCZU-3-F | 17.00% | | |
| CCZU-5-F | 4.00% | | |
| CGU-2-F | 12.00% | | |

-continued

| | | |
|---|---|---|
| CGU-3-F | 10.00% | |
| CCGU-3-F | 3.00% | |
| PCH-7F | 3.00% | |

Example 10

| | | | |
|---|---|---|---|
| CCP-2F.F.F | 10.00% | S → N [° C.]: | <−30.0 |
| CCP-3F.F.F | 11.00% | Clearing point [° C.]: | +71.0 |
| CCP-5F.F.F | 2.00% | Δn [589 nm, 20° C.]: | +0.0854 |
| CCP-20CF$_2$.F.F | 13.00% | d · Δn [20° C., μm]: | 0.55 |
| CCP-50CF$_2$.F.F | 13.00% | Twist [°]: | 90 |
| CCZU-2-F | 4.00% | V$_{10}$ [V]: | 1.10 |
| CCZU-3-F | 14.00% | | |
| CCZU-5-F | 2.00% | | |
| CGU-2-F | 12.00% | | |
| CGU-3-F | 10.00% | | |
| CCGU-3-F | 3.00% | | |
| PCH-7F | 4.00% | | |
| CCG-V-F | 2.00% | | |

Example 11

| | | | |
|---|---|---|---|
| BCH-2F.F | 13.00% | Clearing point [° C.]: | +96.0 |
| BCH-3F.F | 13.00% | Δn [589 nm, 20° C.]: | +0.1344 |
| BCH-5F.F | 13.00% | Δε [1 kHz, 20° C.]: | +8.7 |
| GGP-5Cl | 9.00% | Twist [°]: | 90 |
| CCP-30CF$_2$.F.F | 14.00% | V$_{10}$ [V]: | 1.47 |
| CCP-50CF$_2$.F.F | 14.00% | | |
| CCG-V-F | 7.00% | | |
| ECCP-3F.F | 5.00% | | |
| CCGU-3-F | 4.00% | | |
| PCH-7F | 3.00% | | |
| PGIGI-3-Cl | 5.00% | | |

Example 12

| | | | |
|---|---|---|---|
| CCH-5CF$_3$ | 4.00% | S → N [° C.]: | <−40.0 |
| PCH-7F | 3.50% | Clearing point [° C.]: | +90.0 |
| CCP-2F.F.F | 4.00% | Δn [589 nm, 20° C.]: | +0.0964 |
| CCP-3F.F.F | 7.50% | d · Δn [20° C., μm]: | 0.50 |
| CCP-5F.F.F | 5.00% | Twist [°]: | 90 |
| ECP-3F.F | 5.50% | V$_{10}$ [V]: | 1.48 |
| CGU-5-F | 9.00% | | |
| CCP-20CF$_3$.F | 7.50% | | |
| CCP-30CF$_3$.F | 9.00% | | |
| CCP-50CF$_3$.F | 11.00% | | |
| BCH-3F.F.F | 8.00% | | |
| BCH-5F.F.F | 9.00% | | |
| CCP-40CF$_3$ | 5.00% | | |
| CCP-50CF$_3$ | 7.00% | | |
| CCGU-3-F | 5.00% | | |

Example 13

| | | | |
|---|---|---|---|
| CCH-5CF$_3$ | 2.00% | S → N [° C.]: | <−40.0 |
| PCH-7F | 4.50% | Clearing point [° C.]: | +91.0 |
| CCP-2F.F.F | 4.50% | Δn [589 nm, 20° C.]: | +0.0960 |
| CCP-3F.F.F | 9.00% | γ$_1$ [20° C., mPa · s]: | 197 |
| CCP-5F.F.F | 5.00% | d · Δn [20° C., μm]: | 0.50 |
| CGU-5-F | 9.00% | Twist [°]: | 90 |
| CCP-20CF$_3$.F | 11.00% | V$_{10}$ [V]: | 1.46 |
| CCP-30CF$_3$.F | 11.00% | | |
| CCP-50CF$_3$.F | 11.00% | | |
| BCH-3F.F.F | 5.00% | | |
| BCH-5F.F.F | 10.00% | | |
| CCP-30CF$_3$ | 5.00% | | |
| CCP-40CF$_3$ | 5.00% | | |
| CCP-50CF$_3$ | 3.00% | | |
| CCGU-3-F | 5.00% | | |

Example 14

| | | | |
|---|---|---|---|
| PCH-7F | 4.00% | S → N [° C.]: | <−40.0 |
| CCP-2F.F.F | 10.00% | Clearing point [° C.]: | +90.5 |
| CCP-5F.F.F | 5.00% | Δn [589 nm, 20° C.]: | +0.0967 |
| CGU-5-F | 9.00% | Δε [1 kHz, 20° C.]: | +9.9 |
| ECCP-3F.F | 8.00% | γ$_1$ [20° C., mPa · s]: | 202 |
| CCP-20CF$_3$.F | 11.00% | d · Δn [20° C., μm]: | 0.50 |
| CCP-30CF$_3$.F | 11.00% | V$_{10}$ [V]: | 1.45 |
| CCP-50CF$_3$.F | 11.00% | | |
| BCH-3F.F.F | 6.00% | | |
| BCH-5F.F.F | 10.00% | | |
| CCP-20CF$_3$ | 5.00% | | |
| CCP-50CF$_3$ | 5.00% | | |
| CCGU-3-F | 5.00% | | |

Example 15

| | | | |
|---|---|---|---|
| PCH-7F | 7.00% | S → N [° C.]: | <−40.0 |
| CC-3-V1 | 7.50% | Clearing point [° C.]: | +87.5 |
| CCP-20CF$_3$.F | 11.00% | Δn [589 nm, 20° C.]: | +0.0941 |
| CCP-30CF$_3$.F | 11.00% | γ$_1$ [20° C., mPa · s]: | 160 |
| CCP-50CF$_3$.F | 11.00% | d · Δn [20° C., μm]: | 0.50 |
| PGU-5-F | 5.30% | Twist [°]: | 90 |
| BCH-5F.F.F | 4.00% | V$_{10}$ [V]: | 1.53 |
| CGU-5-F | 10.00% | | |
| CCP-2F.F.F | 8.80% | | |
| CCP-5F.F.F | 5.00% | | |
| CCP-30CF$_3$ | 0.40% | | |
| CCP-40CF$_3$ | 7.00% | | |
| CCP-50CF$_3$ | 8.00% | | |
| CCGU-3-F | 4.00% | | |

Example 16

| | | | |
|---|---|---|---|
| PCH-7F | 7.00% | S → N [° C.]: | <−40.0 |
| CC-3-V1 | 7.50% | Clearing point [° C.]: | +87.5 |
| CCP-20CF$_3$.F | 11.00% | Δn [589 nm, 20° C.]: | +0.0940 |
| CCP-30CF$_3$.F | 11.00% | γ$_1$ [20° C., mPa · s]: | 158 |
| CCP-50CF$_3$.F | 11.00% | d · Δn [20° C., μm]: | 0.50 |
| PGU-5-F | 5.30% | Twist [°]: | 90 |
| BCH-5F.F.F | 4.00% | V$_{10}$ [V]: | 1.54 |
| CGU-3-F | 2.00% | | |
| CGU-5-F | 8.00% | | |
| CCP-2F.F.F | 8.80% | | |
| CCP-5F.F.F | 5.00% | | |
| CCP-30CF$_3$ | 3.40% | | |
| CCP-40CF$_3$ | 5.00% | | |
| CCP-50CF$_3$ | 7.00% | | |
| CCGU-3-F | 4.00% | | |

Example 17

| | | | |
|---|---|---|---|
| PCH-7F | 4.50% | S → N [° C.]: | <−40.0 |
| CC-3-V1 | 4.00% | Clearing point [° C.]: | +90.0 |
| CCH-35 | 4.00% | Δn [589 nm, 20° C.]: | +0.0947 |
| CCP-20CF$_3$.F | 11.00% | d · Δn [20° C., μm]: | 0.50 |
| CCP-30CF$_3$.F | 11.00% | Twist [°]: | 90 |
| CCP-50CF$_3$.F | 11.00% | V$_{10}$ [V]: | 1.53 |
| ECCP-5F.F | 8.00% | | |
| PGU-5-F | 6.50% | | |
| CGU-3-F | 4.50% | | |
| CGU-5-F | 8.00% | | |
| CCP-2F.F.F | 9.00% | | |
| CCP-5F.F.F | 4.50% | | |
| CCP-4OCF$_3$ | 4.00% | | |
| CCP-5OCF$_3$ | 6.00% | | |
| CCGU-3-F | 4.00% | | |

Example 18

| | | | |
|---|---|---|---|
| CCP-2F.F.F | 11.00% | S → N [° C.]: | <−40.0 |
| CCP-4F.F.F | 9.00% | Clearing point [° C.]: | +83.5 |
| CCP-4OCF$_3$ | 6.50% | Δn [589 nm, 20° C.]: | +0.0882 |
| CCP-20CF$_3$.F | 12.00% | γ$_1$ [20° C., mPa · s]: | 186 |
| CCP-30CF$_3$.F | 12.00% | d · Δn [20° C., μm]: | 0.50 |
| CCP-50CF$_3$.F | 12.00% | Twist [°]: | 90 |
| PCH-7F | 5.00% | V$_{10}$ [V]: | 1.33 |
| CGU-2-F | 8.50% | | |
| CGU-5-F | 10.00% | | |
| CCGU-3-F | 4.00% | | |
| CCZU-3-F | 4.00% | | |
| CCZU-5-F | 6.00% | | |

Example 19

| | | | |
|---|---|---|---|
| PCH-7F | 4.60% | S → N [° C.]: | <−40.0 |
| CCH-5CF3 | 6.00% | Clearing point [° C.]: | +94.0 |
| CCP-20CF$_3$.F | 3.90% | Δn [589 nm, 20° C.]: | +0.0896 |
| CCP-30CF$_3$.F | 11.40% | d · Δn [20° C., μm]: | 0.50 |
| CCP-50CF$_3$.F | 12.00% | Twist [°]: | 90 |
| ECCP-3F.F | 12.00% | V$_{10}$ [V]: | 1.57 |
| ECCP-5F.F | 12.00% | | |
| CGU-5-F | 11.00% | | |
| CGU-3-F | 4.10% | | |
| CCGU-3-F | 8.00% | | |
| CCP-5F.F.F | 6.00% | | |
| CCP-4F.F.F | 9.00% | | |

Example 20

| | | | |
|---|---|---|---|
| PCH-7F | 5.00% | S → N [° C.]: | <−40.0 |
| CCH-5CF$_3$ | 6.00% | Clearing point [° C.]: | +88.5 |
| CCP-30CF$_3$.F | 8.00% | Δn [589 nm, 20° C.]: | +0.0931 |
| CCP-50CF$_3$.F | 12.00% | d · Δn [20° C., μm]: | 0.50 |
| ECCP-3F.F | 12.00% | Twist [°]: | 90 |
| ECCP-5F.F | 12.00% | V$_{10}$ [V]: | 1.50 |
| CGU-5-F | 11.00% | | |
| CGU-3-F | 10.00% | | |
| CCGU-3-F | 8.00% | | |
| CCP-5F.F.F | 6.00% | | |
| CCP-4F.F.F | 8.00% | | |
| BCH-5F.F | 2.00% | | |

Example 21

| | | | |
|---|---|---|---|
| CCGU-3-F | 5.00% | Clearing point [° C.]: | +81.5 |
| CCP-2F.F.F | 8.00% | Δn [589 nm, 20° C.]: | +0.0750 |
| CCP-3F.F.F | 12.00% | Δε [1 kHz, 20° C.]: | +8.3 |
| CCP-5F.F.F | 6.00% | d · Δn [20° C., μm]: | 0.50 |
| CCP-20CF$_3$.F | 11.00% | Twist [°]: | 90 |
| CCP-30CF$_3$.F | 12.00% | V$_{10}$ [V]: | 1.61 |
| CCP-50CF$_3$.F | 12.00% | | |
| CCH-5CF$_3$ | 8.00% | | |
| CCP-5OCF$_3$ | 6.00% | | |
| ECCP-5F.F | 8.00% | | |
| PCH-7F | 4.00% | | |
| CCH-3CF$_3$ | 8.00% | | |

Example 22

| | | | |
|---|---|---|---|
| CCH-5CF$_3$ | 3.00% | S → N [° C.]: | <−40.0 |
| PCH-7F | 7.00% | Clearing point [° C.]: | +89.5 |
| CCP-2F.F.F | 10.00% | Δn [589 nm, 20° C.]: | +0.0962 |
| CCP-5F.F.F | 5.00% | d · Δn [20° C., μm]: | 0.50 |
| ECCP-5F.F | 12.00% | Twist [°]: | 90 |
| CGU-5-F | 9.00% | V$_{10}$ [V]: | 1.50 |
| CCP-20CF$_3$.F | 4.00% | | |
| CCP-30CF$_3$.F | 11.00% | | |
| CCP-50CF$_3$.F | 11.00% | | |
| BCH-3F.F.F | 4.50% | | |
| BCH-5F.F.F | 12.00% | | |
| CCP-5OCF$_3$ | 3.50% | | |
| CCGU-3-F | 5.00% | | |
| CBC-53 | 3.00% | | |

Example 23

| | | | |
|---|---|---|---|
| CCH-5CF$_3$ | 5.00% | S → N [° C.]: | <−40.0 |
| PCH-7F | 3.50% | Clearing point [° C.]: | +90.5 |
| CCP-2F.F.F | 3.20% | Δn [589 nm, 20° C.]: | +0.0958 |
| CCP-5F.F.F | 5.00% | d · Δn [20° C., μm]: | 0.50 |
| ECCP-5F.F | 12.00% | Twist [°]: | 90 |
| CGU-5-F | 9.00% | V$_{10}$ [V]: | 1.53 |
| CCP-20CF$_3$.F | 11.00% | | |
| CCP-30CF$_3$.F | 11.00% | | |
| CCP-50CF$_3$.F | 11.00% | | |
| BCH-3F.F.F | 5.30% | | |
| BCH-5F.F.F | 12.00% | | |
| CCP-5OCF$_3$ | 7.00% | | |
| CCGU-3-F | 5.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds having positive dielectric anisotropy, which comprises one or more compounds of the formula I:

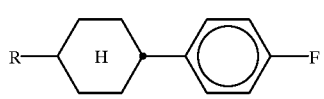  I in which

R is H or an alkyl, alkoxy, alkenyl or alkenyloxy radical having 1 to 15 carbon atoms, and, simultaneously, one or more compounds of the formula IIA and/or one or more compounds of the formula IIB:

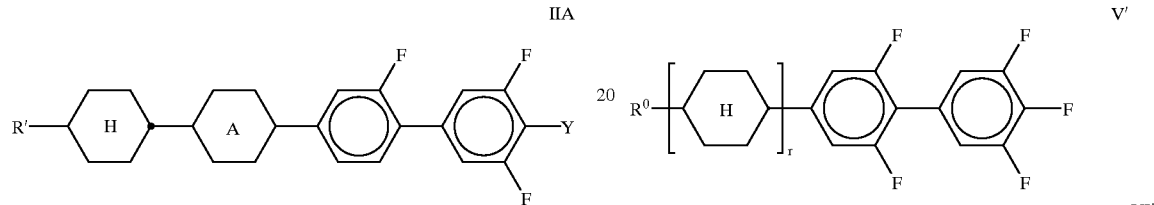  IIA in which

R' is an alkyl or alkoxy radical having 1 to 10 carbon atoms or alkenyl having 2 to 10 carbon atoms,

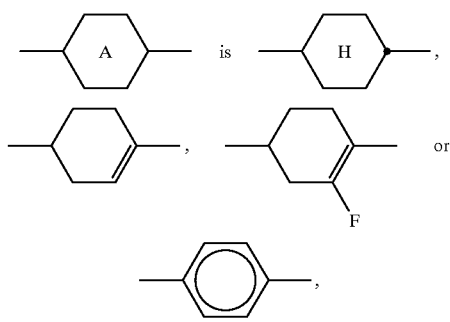

Y is F, Cl, a halogenated alkyl radical having 1 to 5 carbon atoms, in which, optionally, one $CH_2$ group is replaced by —O— or —CH=CH—,

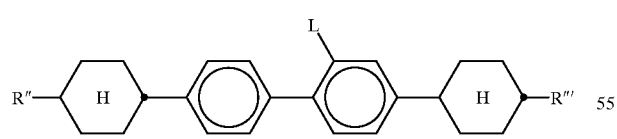  IIB in which

R'' and R''', independently of one another, are an alkyl or alkoxy radical having 1 to 10 carbon atoms or an alkenyl radical having 2 to 10 carbon atoms, and L is H or F, and, simultaneously, one or more compounds of the formulae III' to X':

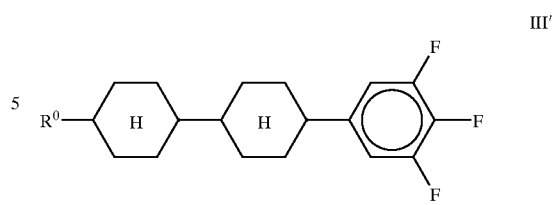  III'

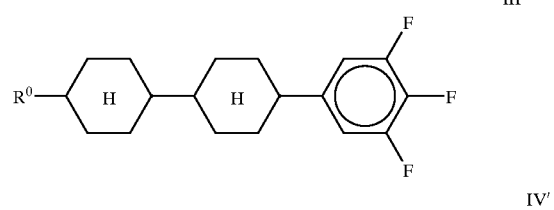  IV'

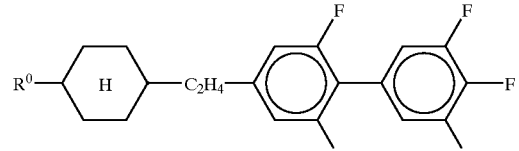  V'

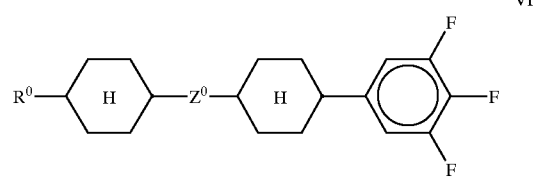  VI'

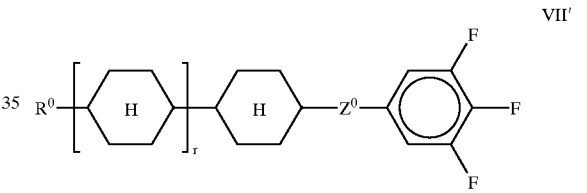  VII'

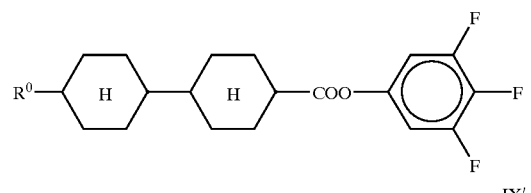  VIII'

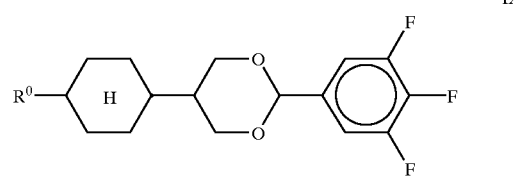  IX'

X' in which the individual radicals have the following meanings:

$R^0$: n-alkyl, oxaalkyl, fluoroalkyl or alkenyl, each having 1 to 9 carbon atoms, Z⁰: —C₂H₄—, —C₂F₄—, —CF=CF—, —CF₂O—, —OCF₂—, —CH₂O— or —OCH₂—, Y³ and Y⁴: simultaneously H or F, and r: 0 or 1.

2. A medium according to claim 1, which additionally comprises one or more compounds selected from the group consisting of the compounds of formulae III to X:

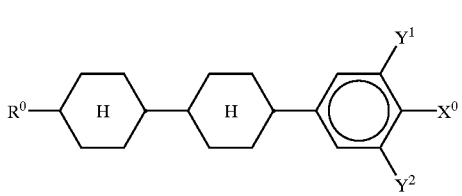
III

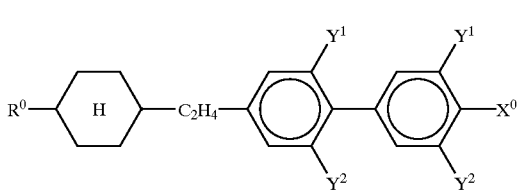
IV

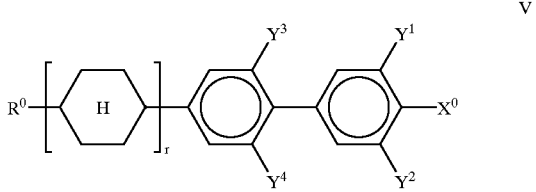
V

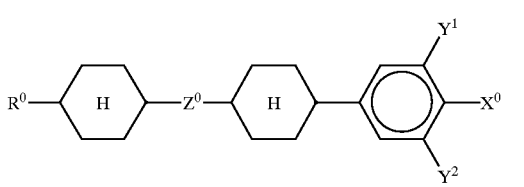
VI

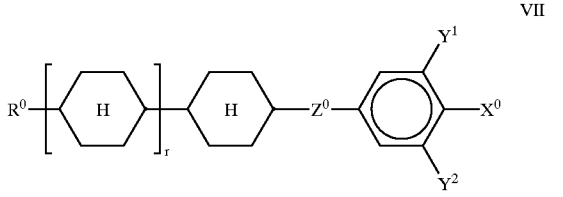
VII

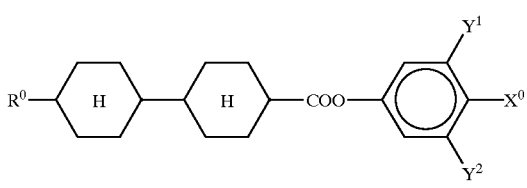
VIII

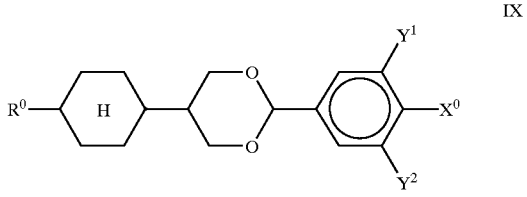
IX

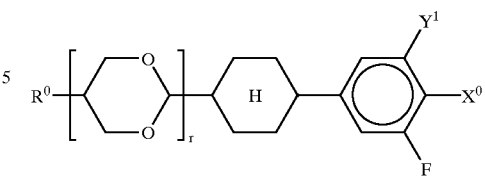
X in which the individual radicals have the following meanings:

R⁰: n-alkyl, oxaalkyl, fluoroalkyl or alkenyl, each having 1 to 9 carbon atoms,

Z⁰: —C₂H₄—, —C₂F₄—, —CF=CF—, —CF₂O—, —OCF₂—, —CH₂O— or —OCH₂—,

X⁰: F, Cl, halogenated alkyl, halogenated alkenyl or halogenated alkoxy having 1 to 6 carbon atoms, Y¹ and Y²: each, independently of one another, H or F, Y³ and Y⁴: simultaneously H or F, and r: 0 or 1, provided that X⁰, Y¹ and Y² are not simultaneously F.

3. A medium according to claim 2, wherein the proportion of compounds of the formulae I to X and III' to X' together in the mixture as a whole is at least 50% by weight.

4. A medium according to claim 1, wherein the proportion of compounds of the formulae I and IIA and/or IIB in the mixture as a whole is from 5 to 85% by weight.

5. A medium according to claim 1, which additionally comprises a compound of the formula:

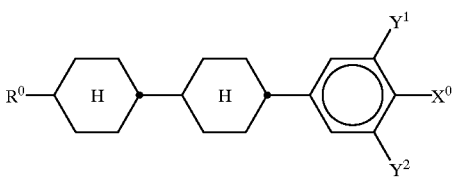

in which

X⁰ is F, OCHF₂ or OCF₃,

Y¹ and Y² are each, independently of one another, H or F, and

R⁰ is n-alkyl, oxaalkyl, fluoroalkyl or alkenyl, each having 1 to 7 carbon atoms.

6. A medium according to claim 1, which additionally comprises at least one compound of the formulae IIIb, IIIc, IIId and/or IIIe:

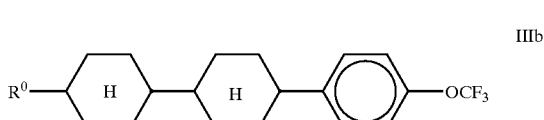
IIIb

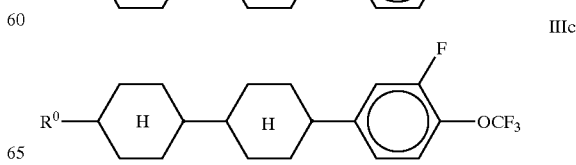
IIIc

IIId

[Structure: R⁰—H—H—phenyl(2,6-diF)—OCF₃]

IIIe

[Structure: R⁰—H—H—phenyl—OCHF₂]

in which R⁰ is n-alkyl, oxaalkyl, fluoroalkyl or alkenyl, each having 1 to 9 carbon atoms.

7. An electro-optical liquid-crystal display containing a liquid-crystalline medium according to claim 1.

8. The medium of claim 2, which comprises one or more compounds of the formulae III, IV, V or VII.

9. The medium of claim 2, which consists essentially of compounds of the formula I, IIA, IIB, III' to VII', and III to VII.

10. The medium of claim 2, which consists essentially of compounds of the formula I, IIA, IIB, III' and III.

11. The medium of claim 1, wherein the proportion of compounds of the formula I is from 2 to 85% by weight and the proportion of the compounds of formula IIA and IIB together is 3 to 70% by weight based on the total medium.

12. The medium of claim 1, wherein the proportion of compounds is 2 to 6% of formula I, 5 to 10% of formula IIA and 0 to 8% of formula IIB, by weight based on the total medium.

13. The medium of claim 1, wherein the medium exhibits a dielectric anisotropy, $\Delta\epsilon$, of $\geq 8$.

14. The medium of claim 2, which further comprises one or more compounds selected from the group consisting of compounds of the formulae XI to XVI:

XI

[Structure: R⁰—H—H—phenyl—phenyl(Y¹,Y²)—X⁰]

XII

[Structure: R⁰—H—H—C₂H₄—phenyl—phenyl(Y¹,Y²)—X⁰]

XIII

[Structure: R⁰—H—H—H—phenyl(Y¹,Y²)—X⁰]

XIV

[Structure: R⁰—H—H—C₂H₄—phenyl(Y¹,Y²)—phenyl—X⁰]

XV

[Structure: R⁰—H—H—C₂H₄—H—phenyl(Y¹,Y²)—X⁰]

XVI

[Structure: R⁰—H—phenyl—phenyl(Y¹,Y²)—H—X⁰]

in which R⁰, X⁰, Y¹ and Y² each, independently of one another, have the above meanings.

15. The medium of claim 14, wherein the proportion of compounds of the formulae III' to X' and III to XVI in the mixture as a whole is from 10 to 95% by weight.

16. The medium of claim 1, wherein the medium contains a compound of the formula IIA wherein Y is F or OCF₃.

17. The medium of claim 1, wherein the medium retains a nematic phase at least down to −20° C. and has a threshold voltage below 1.4.

18. The medium of claim 1, wherein the medium retains a nematic phase at least down to −30° C. and has a threshold voltage below 1.1.

19. The medium of claim 1, wherein the medium has a clearing point of from 65 to 120° C.

* * * * *